United States Patent [19]
Viracola

[11] 3,835,449
[45] Sept. 10, 1974

[54] METHOD AND APPARATUS FOR CLASSIFYING THE TIRE WIDTH OF MOVING VEHICLES

[76] Inventor: Joseph R. Viracola, P.O. Box 2, Santa Monica, Calif. 90406

[22] Filed: May 24, 1972

[21] Appl. No.: 256,568

[52] U.S. Cl. .......................... 340/38 R, 200/86 A
[51] Int. Cl. ...................... G08g 1/015, G08g 1/02
[58] Field of Search ........ 340/22, 31 R, 38 R, 38 L, 340/39; 200/86 R, 86 A

[56] References Cited
UNITED STATES PATENTS

| | | | |
|---|---|---|---|
| 2,165,227 | 7/1939 | Cooper | 340/31 R |
| 2,525,824 | 10/1950 | Nagel | 340/31 R |
| 2,885,508 | 5/1959 | Wilcox | 340/38 R |
| 2,922,003 | 1/1960 | Roscoe | 340/38 R |
| 2,992,776 | 7/1961 | Roscoe | 340/38 R |
| 3,748,443 | 7/1973 | Kroll | 340/38 R |

*Primary Examiner*—Kathleen H. Claffy
*Assistant Examiner*—Randall P. Myers

[57] ABSTRACT

The method of arranging a row of tire sensing devices across about half a traffic lane, arranging the devices into groups whose length is no greater than the difference in width between the narrowest dual tire to be detected as such and the widest single tire to be detected as such, arranging the groups into a series of blocks each containing N groups producing a first output indicating that a tire has passed whenever a tire encounters any one of the sensing devices, and producing a sound output indicating that the passing tire is a dual tire whenever the tire has encountered a sensing device in each one of a first, second, and Nth group of devices.

15 Claims, 11 Drawing Figures

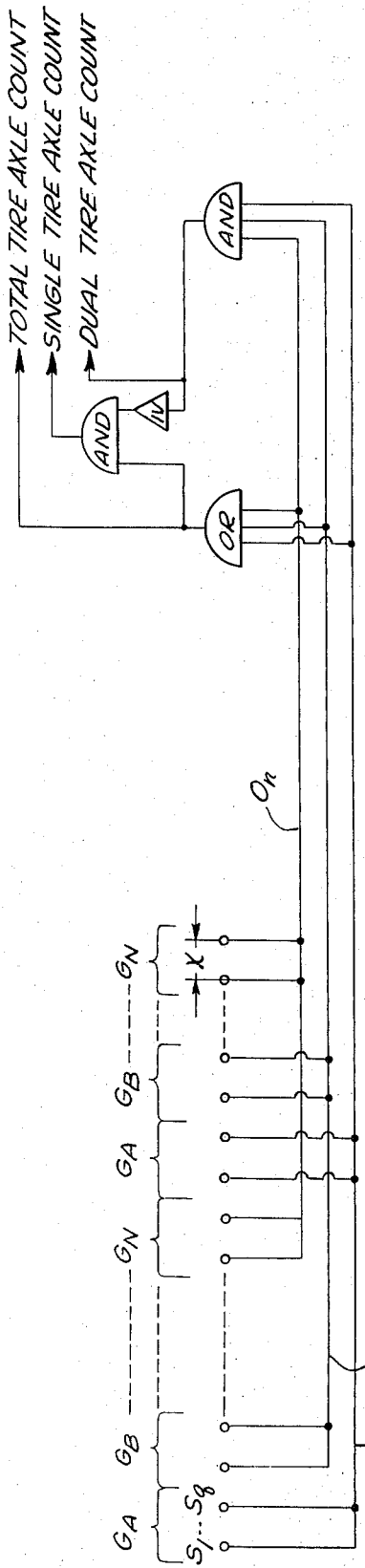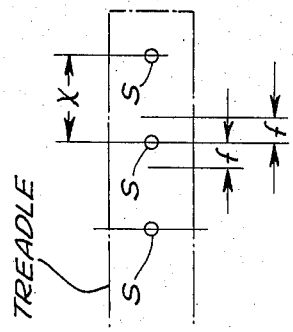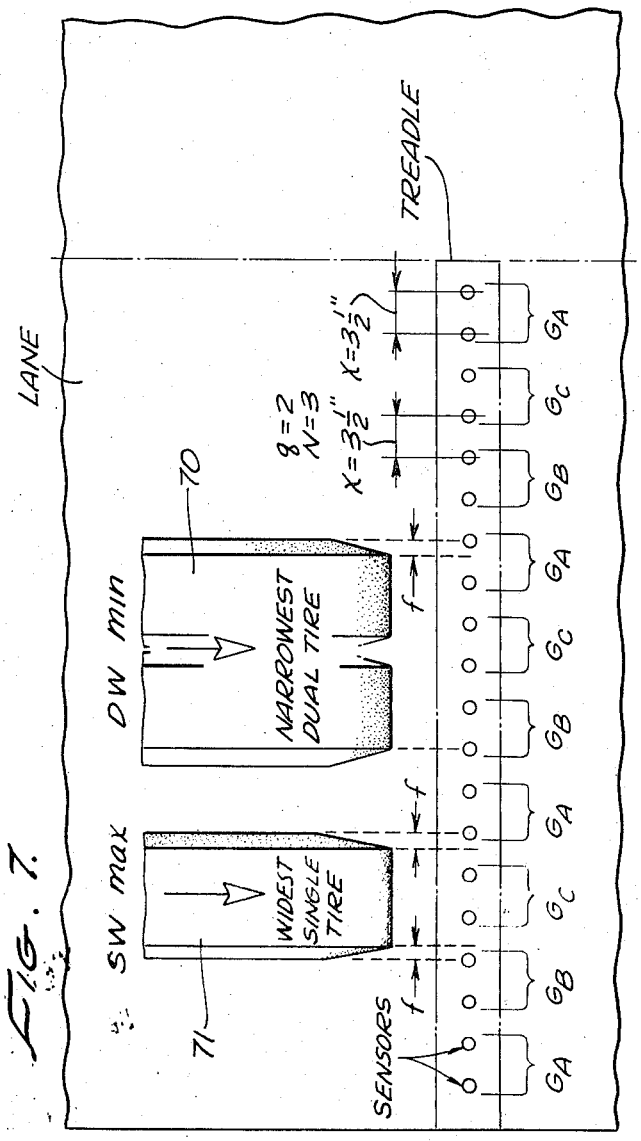
Fig. 6.
Fig. 6(a).
Fig. 7.

METHOD AND APPARATUS FOR CLASSIFYING THE TIRE WIDTH OF MOVING VEHICLES

BACKGROUND OF THE INVENTION

The art of traffic counting has been well established. It is well known to utilize a mechanical treadle extending across a roadway in order to indicate the passage of vehicles, and thus provide signals from which the vehicles (or more specifically, their axles) may be counted. Various other types of apparatus have also been used in order to detect the passage of a vehicle electronically, optically, magnetically, or by other means.

The practice of classifying traffic according to the type of vehicle has also become relatively well known. Numerous governmental bodies are faced with the problem of planning the nature and the cost of future highway construction. In order to assist in making such plans, and in obtaining the funds for carrying them out, it is often advisable or necessary to determine what types of vehicles are traveling on a particular roadway. For example, a truck will occupy more of the available space on the roadway than will a passenger car, will impose a far heavier load on the structure, and may also travel at a significantly lower speed. All of these factors enter into the planning of future highways and their utilization.

Another need for traffic classification arises when tolls are being collected. Certain expressways and bridges have been constructed with borrowed funds, and a toll must be collected from each vehicle which uses the structure in order to repay the cost. For this purpose a small truck will be charged at a different rate than a passenger car, while a large truck will be charged at a different rate than a small truck.

Whether the classification is being done for future planning and financing purposes, or for the collection of tolls, it has been the practice to use workers located at the scene to accomplish this task. In other words, mechanical (or electrical, optical, etc.) equipment has been relied upon for the purpose of counting the vehicles (or their axles), but not for the purpose of distinguishing the vehicle types.

SUMMARY OF THE PRESENT INVENTION

According to the present invention a number of tire sensing devices are placed upon a roadway surface, with the lateral spacing between adjacent sensing devices being close enough so that the narrowest tire to be detected will encounter at least one of the devices. The devices are arranged into groups, and the groups of devices are arranged into blocks, and the operation of the sensing devices is then monitored in such a manner as to distinguish between a relatively wide tire and a relatively narrow tire.

For example, according to the present invention, it is possible to determine whether a particular passing tire is a relatively narrow one, such as generally found on a passenger car, or a relatively wide one such as the dual tires of a truck. The use of the present invention therefore makes it possible to supply input signals to associated equipment, which associated equipment may be utilized for registering the total counts of different types of vehicles.

Thus, according to the present invention, the mechanical positioning of the sensing devices upon the roadway is determined by characteristics of the roadway itself, by characteristics of the vehicles and the vehicle tires, and by the objective or objectives that have been established for the classifications process. Computer logic circuitry is utilized in an appropriate manner to analyse the action of the passing tires upon the sensing devices and thereby produce output signals which contain the information needed by the associated traffic classification equipment.

Thus, the principal object of the present invention is to provide a method and apparatus which are relatively simple, easy to use, and inexpensive, for identifying the tire width of the vehicles passing along a roadway in order to thereby provide input information that is needed by associated traffic classification equipment.

DRAWING SUMMARY

FIG. 6 is a schematic diagram of the general form of the detection apparatus of the present invention;

FIG. 6a is a schematic diagram illustrating the spacing of sensors;

FIG. 7 is a scale diagram illustrating one particular arrangement of sensing devices in relationship to the dual and single tires they are to detect;

THE TECHNICAL PROBLEM

Figure 1:
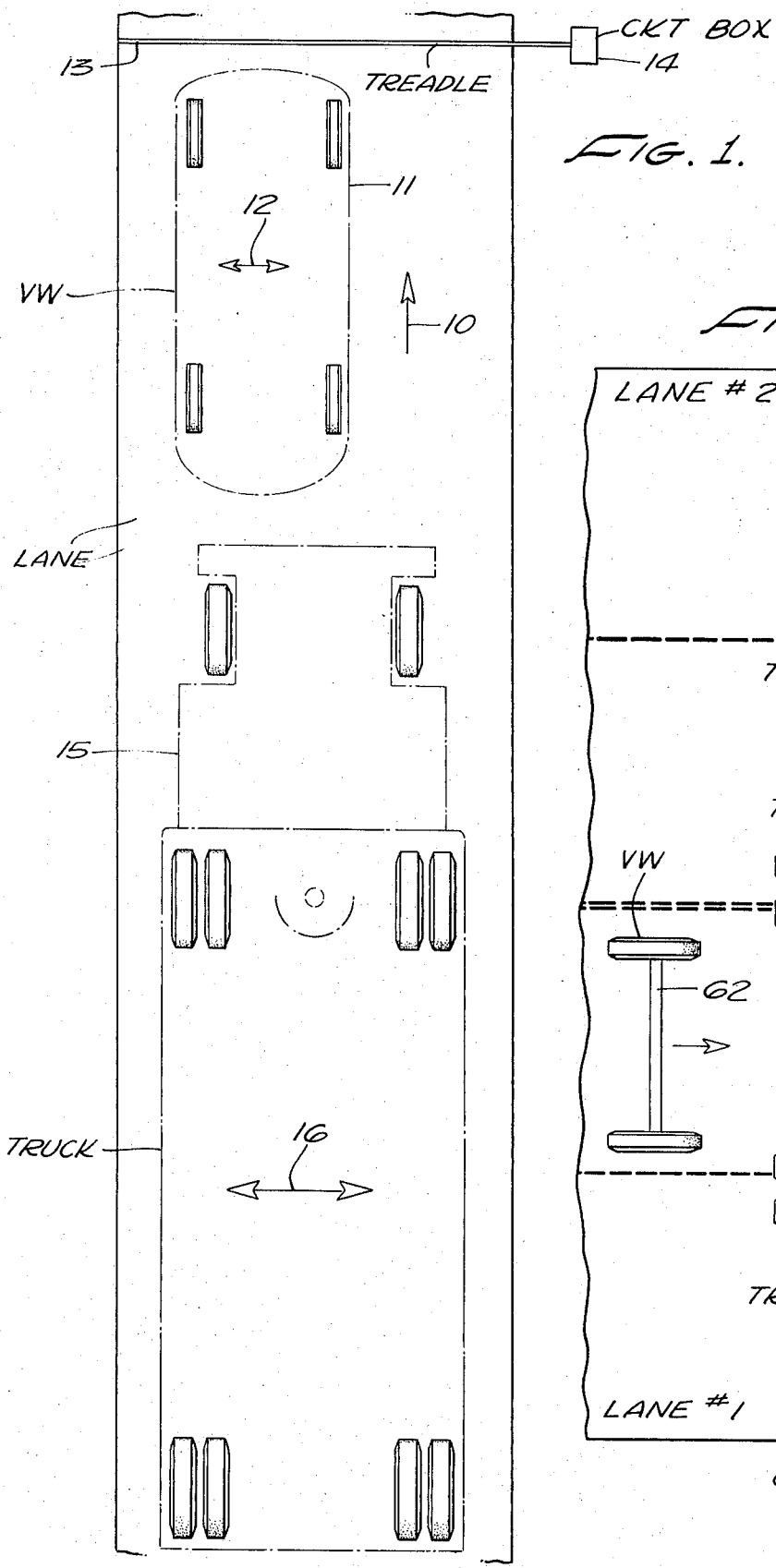
FIG. 1 is a top plan view of a roadway surface with vehicles traveling thereon.
Figure 2:
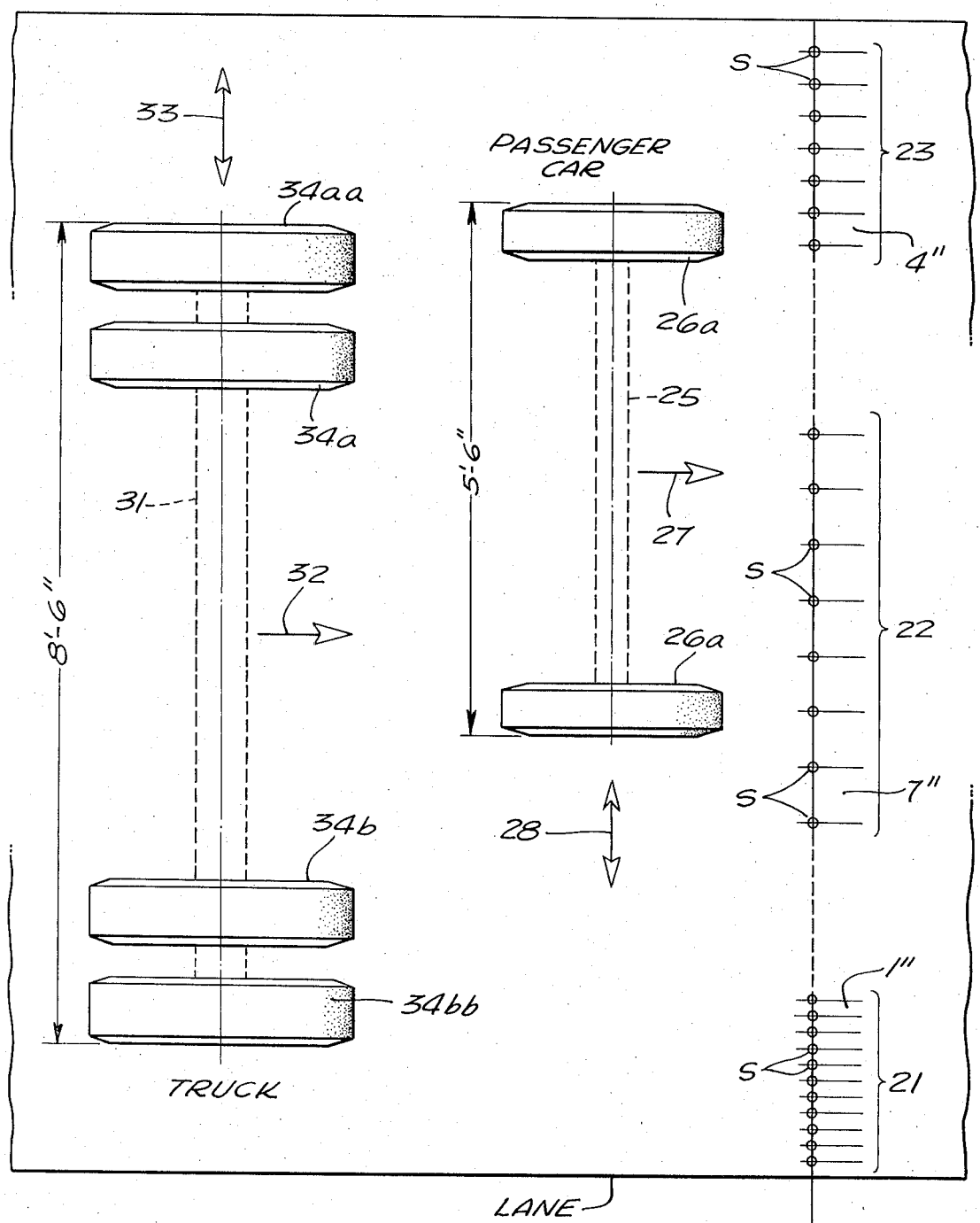
FIG. 2 is a top plan view of a portion of a traffic lane illustrating some possible positions of vehicle tires and of sensing devices thereon.

FIGS. 1 and 2 indicate the nature of the problem which my invention has solved.

In FIG. 1 the arrow 10 indicates the forward movement of traffic down a lane of a roadway. Numeral 11 identifies a relatively small passenger vehicle such as a Volkswagen (VW). In FIG. 1 the VW 11 is shown in a particular position, somewhat to the left of center of the traffic lane. However, laterally directed arrow 12 indicates that the vehicle 11 could, in fact, occupy any one of an infinite number of lateral positions, depending upon the desire of the driver and other circumstances.

A treadle 13 extends entirely across the traffic lane, and is coupled to a circuit box 14. If it is only desired to count the axles (pairs of wheels) of the vehicle 11, then regardless of the lateral position of the vehicle, it will be possible to register the proper count by means of the circuit box 14. However, if it were also desired to measure the tire width, this would be difficult because the lateral position of the vehicle (and hence of its tires) must be considered an unknown.

Also in FIG. 1 the truck 15 is shown approaching treadle 13 and circuit box 14. Truck 15 has a pair of single tires at the front of the tractor, two pairs of dual tires (one axle) at the rear of the tractor, and another pair of dual tires at the rear of an associated semi-trailer. Laterally extending arrow 16 indicates that the lateral position of the truck is (in a mathematical sense) an unknown, because, althoguh the truck is shown in one particular lateral position, it could be any distance to the left of that position or any distance to the right of that position. Thus, again it will be a relatively easy matter to count the axles as the associated tires pass over treadle 13, but identifying the tire widths would be difficult.

FIG. 2 is an enlarged view of a portion of a traffic lane, which permits a more detailed description of the problem which existed heretofore and which has been solved by the present invention.

As shown in FIG. 2, a circuit box 24 is positioned beside the roadway, and opposite the circuit box there is a row of sensing devices S which extend across the entire lane of traffic. By way of illustration a group 21 of the sensing devices S is shown with one inch spacing between each two adjacent devices of the group. Another group 22 of the sensing devices S is shown with seven inch spacing between adjacent sensing devices. Another group 23 of sensing devices S is shown with four inch spacing between adjacent devices. These different groups of sensing devices, and their mechanical arrangement on the roadway, have been established by hypothesis, in order to illustrate the problem.

FIG. 2 also shows a single-tire axle 25 having associated single tires 26a and 26b. Arrow 27 indicates the forward movement of axle 25 toward the row of sensing devices S. The laterally directed arrow 28 indicates that the lateral position of axle 25 may be precisely as shown, or it may be any amount either to the left or to the right. The dimensions of axle 25 are shown for a typical passenger car where the wheel separation is 5 feet 6 inches. It will be seen that as the axle 25 passes over the row of sensors S, each of the tires 26a and 26b may encounter one or more of the devices S. However, the fact that a particular device S has been encountered by a tire would not establish anything regarding the width of that tire. If two adjacent ones of the devices S contained in the group 23 are encountered by the tire, this would appear to indicate that a tire having a width of four inches or more has passed.

However, since (as shown by arrow 28) the lateral position of axle 25 is an unknown, then the passage of tire 26a through the sensor group 23 would not necessarily activate two of the sensors, but might activate only a single one. It thus becomes evident that not only is the lateral spacing of the sensors S a factor to be considered, and the width of the tire, but also the lateral position of the tire. Since the lateral position is an unknown, by definition, a solution to the problem is difficult.

To further complicate the situation it will be recognized that not all passenger cars have a wheel width of 5 feet 6 inches. Some are wider and some are narrower. It therefore follows that when a particular tire of a pair of tires is in a known position, activating a known number of sensors, the relative lateral position of the other tire of the pair is still an unknown and the number and location of sensors that it would activate would also be an unknown.

FIG. 2 also illustrates a dual-tire axle 31 which, as indicated by arrow 32, is traveling in a direction toward the row of sensors S. One end of axle 31 carries the dual tires 34a and 34aa, while the other end carries dual tires 34b and 34bb. The laterally extending arrow 33 indicates that the lateral position of axle 31 may be precisely as shown, or any distance either to the right or to the left. A notation adjacent axle 31 indicates that the outside width of its associated tires is 8 feet 6 inches, which is typical for a truck axle.

It will be noted that when the tires 34a, 34aa pass over the row of sensors S, it is possible that they will straddle one of the sensors which will be located in the space between the tires, in which case that particular sensor would not be activated. It will also be noted that the number and location of sensors activated by the passage of these tires will depend upon the spacing of the sensors, the width of the tires and the space between them, and also the lateral position of the tires, which is a variable or unknown factor. Furthermore, the outside width of the tires would not, in all cases, be precisely 8 feet 6 inches, and therefore a particular lateral position of one pair of the tires would immediately determine what sensors it will activate but would not determine precisely what sensors would be activated by the other associated pair of tires.

A Partial Solution

Figure 5:
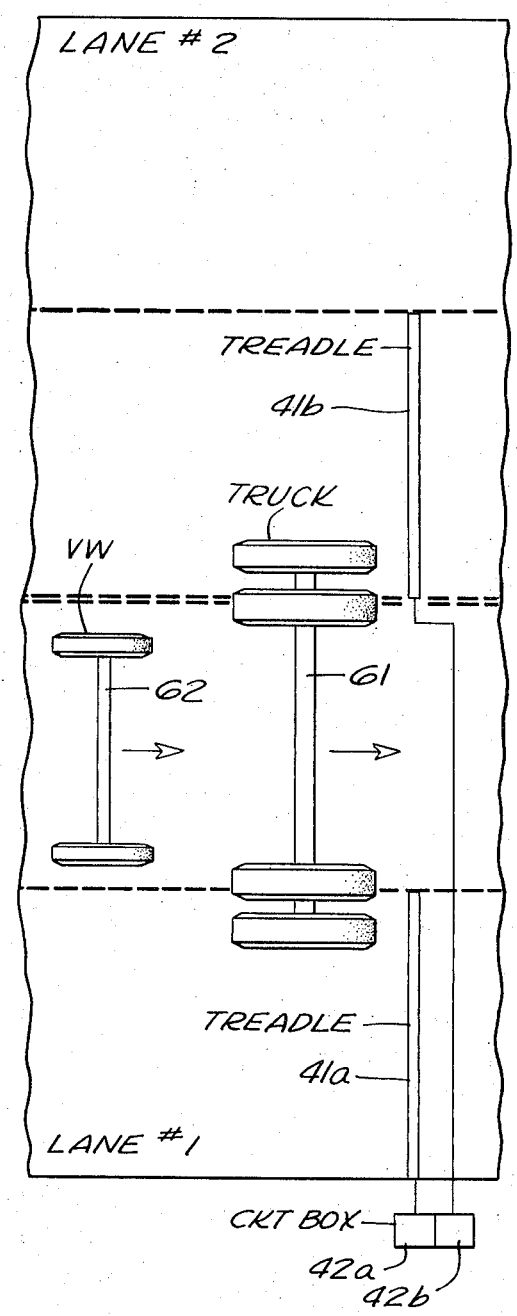
FIG. 5 is a top plan view of a portion of two adjacent traffic lanes showing positions of vehicle wheels and treadles thereon.
Figure 3:
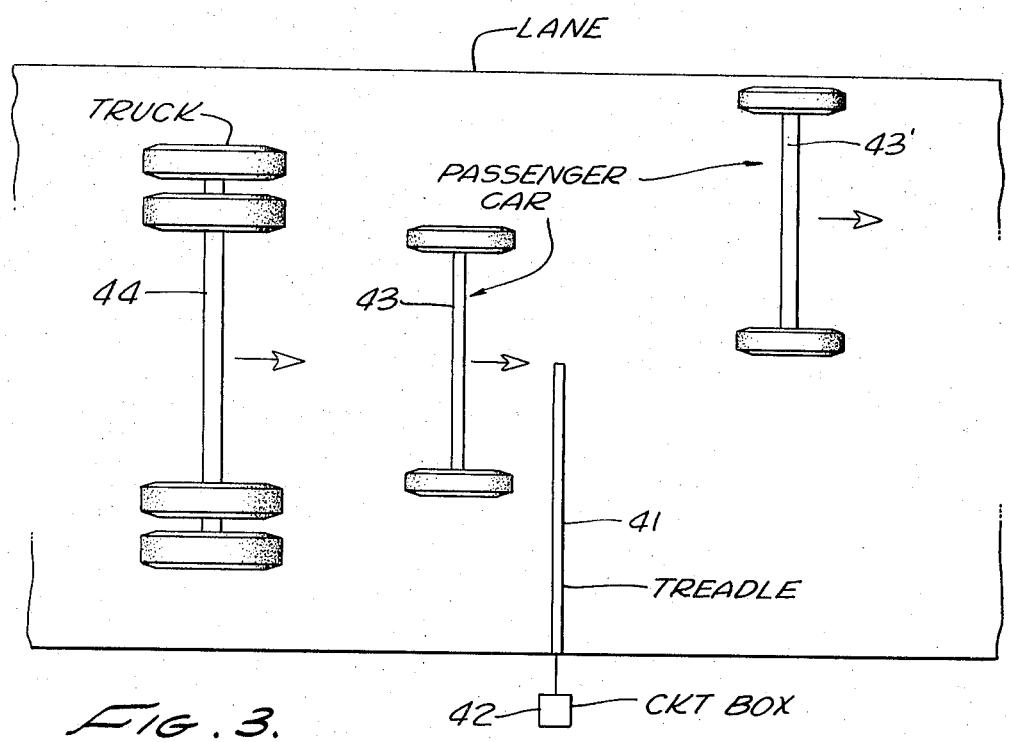
FIG. 3 is a top plan view of a portion of a traffic lane illustrating possible positions of vehicles tires relative to a treadle which extends across only about half of a lane.
Figure 4:
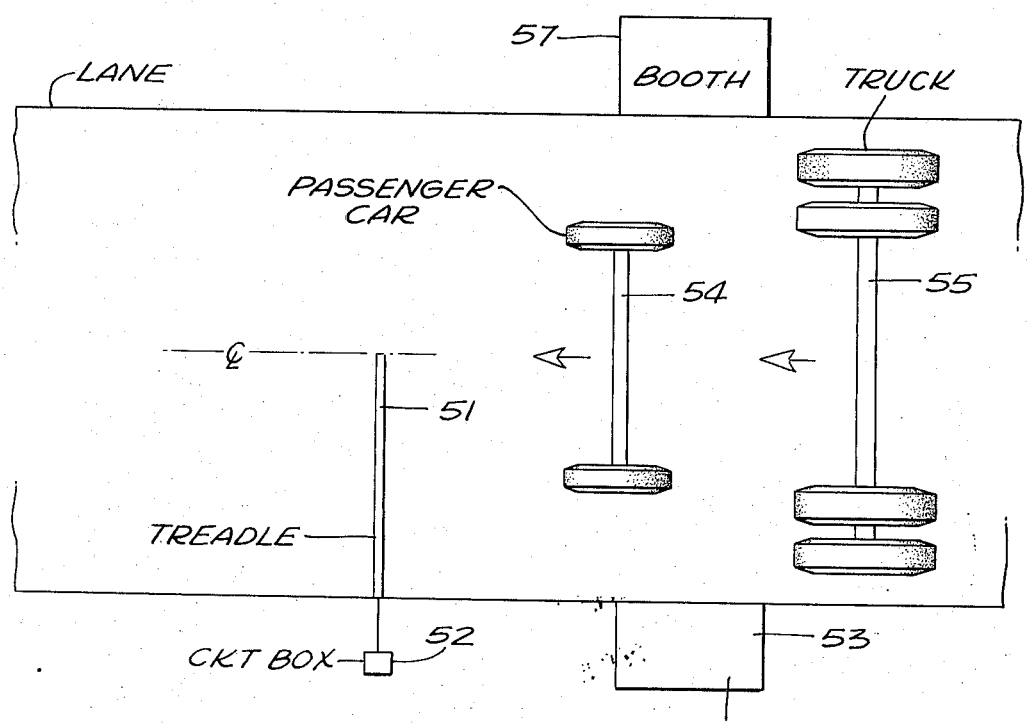
FIG. 4 is a top plan view of a portion of a traffic lane adjacent a toll collection booth.

FIGS. 3, 4, and 5 illustrate how the present invention has achieved a partial solution to the classification problem.

FIG. 3 shows a treadle 41 which extends across only one side of a particular traffic lane, and more specifically occupies about one half of the width of the lane. The output of treadle 41 is delivered to a circuit box 42 beside the roadway. A single-tire axle 43 (passenger car) is shown in two different positions. In its usual or normal position the axle 43 is approximately in the lateral center of the traffic lane, so that one of its tires will pass by the end of treadle 41 while its other tire will engage and pass over the treadle. In an alternate position, identified as 43', the same axle is shown at the extreme left-hand side of the traffic lane, and in this lateral position it has passed the treadle 41 without being detected.

Thus, as illustrated in FIG. 3, an axle of a passenger car, because of its width relative to the width of a conventional traffic lane (usually 12 feet), may, on occasion, pass by the treadle 41 without being detected. Statistically speaking, however, it can be safely assumed that a relatively small percentage of the passenger car axles would go undetected in this manner.

FIG. 3 also illustrates a dual-tire axle 44 (truck) moving down the traffic lane. Axle 44 is shown in its normal or usual position, in the approximate lateral center of the lane. When it reaches the location of treadle 41 there will be one pair of tires which pass by the treadle, but the other pair of tires will pass over the treadle and the passage of the axle will be detected thereby. Due to the relatively greater width of the truck axle as compared to the passenger car axle, it would not be possible for the truck axle to go uncounted unless it were moved to the extreme left-hand side of the lane and beyond. In other words, if the truck driver stays in the lane his vehicle is going to be counted by the treadle 41.

In the previous paragraph reference has been made to counting the axles. However, it must be emphasized that the present invention is not concerned with counting, which was well known in the prior art, but rather with the problem of classification. Classification, of course, implies that not only is the object counted, but it is also identified or characterized in some manner.

Thus, one of the basic concepts of the present invention is that there is a great deal to be gained by using a relatively short treadle, such as the treadle 41 which occupies only about half of the traffic lane, because while this poses a certain statistical probability of missing the count it nevertheless makes it possible to provide reliable and accurate classification of those tires which are counted (as will be described subsequently).

FIG. 4 illustrates the application of the invention at a toll collection booth. Toll booth 53 is typically located on the left-hand side of the roadway. Booth 57, used for collecting tolls from the adjoining lane of traffic, is immediately opposite booth 53. The width of the traffic lane between booths 53 and 57 is not the usual twelve feet, but is deliberately restricted to ten feet in order to simplify the job of the operator of the toll booth in making his collections from the drivers of the vehicles. A short distance beyond the booth 53 is a treadle 51, extending across about half the width of the traffic lane on the side thereof adjacent booth 53. Treadle 51 is only about 4 ½ feet or 5 feet long, rather than 5 ½ feet or 6 feet as would be the case in the normal traffic lane as illustrated in FIG. 3. Output signals from treadle 51 are supplied to a circuit box 52.

FIG. 4 also shows a single-tire axle 54 of a passenger car, and because of the narrower width of the lane it is not possible for axle 54 to move past the toll booth 53 without having its left-hand tire pass over the treadle 51. A dual-tire axle 55 (truck) is also shown, and since it occupies nearly the full width of the lane it obviously cannot pass the treadle 51 without being counted.

FIG. 5 illustrates a somewhat different aspect of the invention. FIG. 5 illustrates a portion of two adjacent lanes of traffic which are on the same side of a roadway so that the traffic moves the same direction in both lanes. The lanes are designated as lane No. 1 and lane No. 2. In accordance with the invention a treadle 41a extends across about half the width of lane No. 1, on the right-hand side of the lane. Treadle 41a supplies signals to associated circuit box 42a. Another treadle 41b of the same length as 41a is located across the right-hand half of lane No. 2. Treadle 41b supplies signals to circuit box 42b.

FIG. 5 also shows a truck axle 61, equipped with dual tires, moving down the roadway. The axle 61 indicates that the truck driver has gotten somewhat out of his lane, and while the greater portion of the truck occupies lane No. 1, the left-hand part of the truck extends a short distance into lane No. 2. In this lateral position of truck axle 61, it is evident that a count for that axle will be registered by the treadle 41a, and also by the treadle 41b. Thus a false count is produced. As far as the circuit boxes 42a and 42b are concerned, one vehicle axle has passed in lane No. 1 and another vehicle axle has passed in lane No. 2. This type of error is inherent in accordance with the method of the present invention; however, from a statistical point of view it can be stated that such errors would constitute a very small percentage of the total number of vehicles counted and classified.

FIG. 5 also illustrates a single-tire axle 62 belonging to a passenger vehicle, such as a VW. Axle 62 is shown traveling down the left-hand side of lane No. 1. In this lateral position of the axle it will not be counted by either the treadle 41a or the treadle 41b. Thus an error is produced, because a vehicle has passed without being counted. However, from a statistical point of view it can be stated that such errors would be a very small percentage of the total number of passing vehicles.

FIGS. 3 and 5 and the accompanying discussion have indicated that some errors in counting the vehicles (or axles) will be made in carrying out the classification method of the present invention. However, these errors are relatively small, and it is known that there will be a slight overcount for trucks and a slight undercount for small passenger cars.

The Invention

By utilizing a treadle extending across only about one half of the traffic lane, on one side of the lane, the variable width of the vehicle is no longer a factor. Only one side of the vehicle is observed by the detection apparatus, and classification of the tire width on that one side of the vehicle therefore becomes possible.

Reference is now made to FIG. 6 which schematically illustrates the apparatus of the present invention in its general form. The row of sensing devices contained within the treadle (or some equivalent to a treadle) are arranged into groups designated $G_A$, $G_B$...$G_N$. Each group contains at least $q$ sensors, where $q$ may be one or an integer greater than one. All of the sensors are arranged into successive blocks, each containing $N$ groups of sensors, where $N$ is three or larger. The group length is the same for all groups.

Computer logic circuits contained in the associated circuit box provide the analysis of the activation of any one or more of the sensing devices S. Output lines $O_1$, $O_2$...$O_n$ are provided in the treadle (or its equivalent). All of the group $G_A$ sensing devices are coupled to output line $O_1$. All of the group $G_B$ sensing devices are coupled to the output line $O_2$. All of the group $G_N$ sensing devices are coupled to the output line $O_n$.

In the circuit box all of the output lines $O_1$, $O_2$...$O_n$ are connected as inputs to an OR circuit. The output of the OR circuit indicates total tire axle count. That is, when any one or more of the sensors, in any one or more of the groups, in any one or more of the blocks, is activated, it will produce an output from the OR circuit. THE TOTAL TIRE AXLE COUNT may for convenience be abbreviated as TT.

All of the output lines $O_1$, $O_2$...$O_n$ are also coupled to an AND circuit. Activation of at least one Group A sensor and at least one Group B sensor and at least one Group---N sensor produces an output from the AND circuit which provides a DUAL TIRE AXLE COUNT, identified for convenience as DT.

From the TT count and the DT count it is a simple matter to obtain a single tire axle count, as for example by supplying the TT signal directly to another AND circuit while the DT signal is applied to this second AND circuit through an intervening inverter circuit designated as IV.

The mathematical analysis of the invention is aided by FIG. 6a which shows the spacing between adjacent sensors as $x$ while $f$ indicates the width of a fringe area on each side of a sensor which will respond to a tire.

The terminology, definations, algebraic formulae, and Boolean algebraic formulae of the present invention may be summarized as follows:

Terminology And Definitions $S$ = Sensor
$G$ = group of sensors
$H$ = block of groups
$N$ = number of groups in block H ($N \geq 3$)
$f$ = width of fringe area on each side of sensor which will respond to tire.
$x$ = sensor spacing
$q$ = number of sensors in group
$y$ = group length = $qx$
$OC$ = Output Conductor
$CC$ = Common Connection Conductor
$TT$ = total tire count
$ST$ = single tire count
$DT$ = dual tire count
$SW\text{max}$ = maximum width of single tire to be detected $DW\text{min}$ = minimum width of dual tire to be detected Formulae (algebraic)

1. $SW\text{max} = (N-2)y + x - 2f$
2. $DW\text{min} = (N-1)y + x - f$
3. $DW\text{min} - SW\text{max} = y - f$ Formulae (Boolean)

4. $TT = G_A + G_B + \cdots G_N$
5. $DT = G_A \cdot G_B \cdot \cdots G_N$
6. $ST = TT$ and not $DT$ Design Criteria (from Equation 3)

7. $y \leq DW\text{min} - SW\text{max} + f$

Particular Embodiments

FIG. 7 illustrates a particular embodiment in which the sensor spacing $x$ is 3½ inches. The numeral 70 identifies the value $DW\text{min}$ or minimum width of dual tires to be detected. The numeral 71 identifies $SW\text{max}$, maximum width of single tire to be detected. The sensor loactions and tire widths are shown to scale. It will be seen that $q$ is 2 and $N$ is 3.

Figure 8:
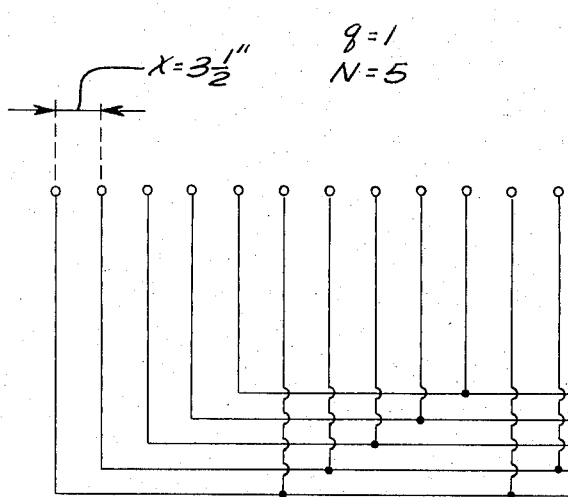
FIG. 8 is a schematic diagram of another specific embodiment of the invention.

FIG. 8 illustrates another particular embodiment of the invention where sensor spacing $x$ is 3½ inches, $q$ is 1 and $N$ is 5.

Where it is desired to count motorcycles as two-axle single-tire vehicles, the sensor spacing as shown in FIGS. 7 and 8 is too wide, and this can be corrected by doubling the number of sensors so that the spacing is 1¾ inches. The sensors may be located even closer together as desired.

In another embodiment of the invention, for example, sensor spacing may be 2¼ inches while $q$ is 2 and $N$ equals 4.

Treadle Construction

Figure 10:
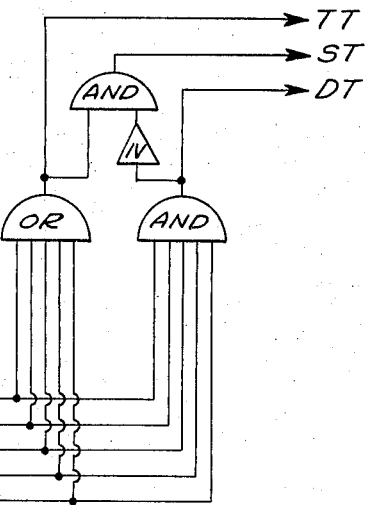
FIG. 10 is a top plan view of the treadle of FIG. 9.
Figure 9:
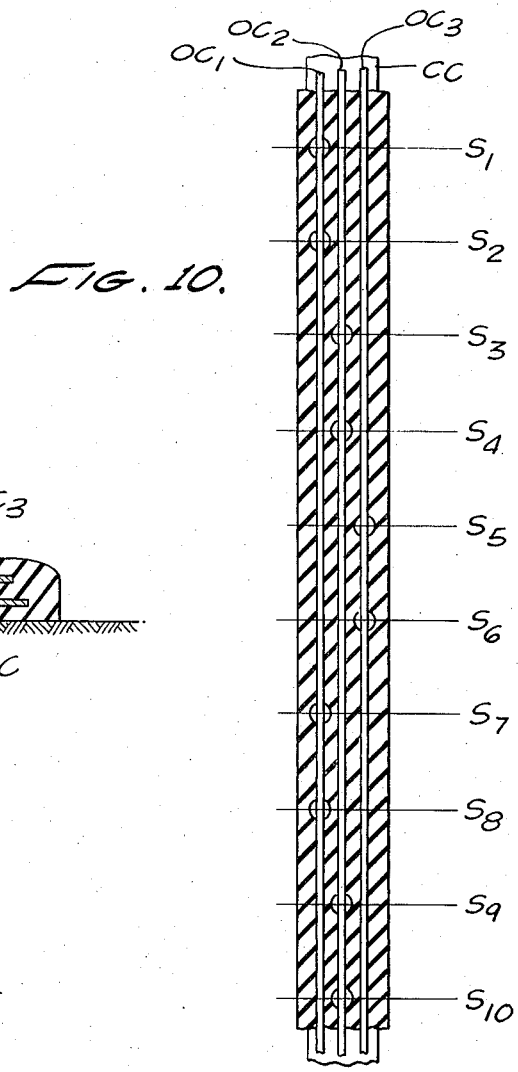
FIG. 9 is a vertical cross-sectional view of a mechanical treadle constructed in accordance with the present invention.

The sensing devices $S$ may be constructed as individual units utilizing light-sensitive devices, pressure-sensitive devices, or other appropriate means. For example, the sensing devices may be constructed in the manner illustrated in my prior co-pending application, Ser. No. 244,115, filed Apr. 14, 1972, Docket 2567-A, now U.S. Pat. No. 3,721,784. In carrying out the invention it may also be desirable to utilize a type of treadle construction as shown in FIGS. 9 and 10. A common conductor $CC$ is a wide, flat, metal band. Output conductors $OC1$, $OC2$, $OC3$ are relatively narrow, flat, metal bands. The output conductors occupy a plane which is spaced from the common conductor and insulated by insulating material I. They are also laterally separated from each other. This assembly is contained in envelope E. Individual sensor locations are formed by removing a portion of the insulating material I so that the associated one of the output conductors is capable of being depressed against the common conductor $CC$, so as to conductively engage the same. The mode of construction of this type of mechanical treadle is illustrated and described in greater detail in my prior, co-pending application, Ser. No. 12,662, filed Feb. 19, 1970, now abandoned.

It will be noted that in the construction shown in FIG. 10 each sensor group and its repetitions in later blocks of groups is coupled to a single output conductor.

Alternate Forms

It will be understood that the apparatus of the present invention may be incorporated in the permanent structure of a roadway, or may be incorporated in a treadle or housing which is removably positioned upon the roadway surface. The latter approach is preferred for traffic studies for future planning, because it permits the classification equipment to be moved from one location to another, on an as needed basis.

As will be understood by those skilled in the art, what has been described are preferred embodiments in which modifications and changes may be made without departing from the spirit and scope of the accompanying claims.

What is claimed is:

1. A method of classifying moving vehicles according to their tire width, comprising:
   a. placing a plurality of tire sensing devices in laterally spaced positions to form a row extending across about half of a traffic lane with adjacent devices being sufficiently close together so that the narrowest tire to be detected will encounter at least one of said devices;
   b. arranging said sensing devices into groups of equal length such that the group length is no greater than the difference in width between the narrowest dual tire to be detected as such and the widest single tire to be detected as such;
   c. arranging said groups into a series of blocks each containing a first, second---Nth group of said sensing devices, the length of N-1 of said groups being less than the width of the narrowest dual tire to be detected as such;
   d. producing a first output indicating that a tire has passed, whenever a tire encounters any one of said sensing devices;
   e. producing a second output indicating that the particular tire is a dual tire, whenever a tire encounters a sensing device in each one of a first, second and---Nth groups; and
   f. producing a third output indicating that the particular tire is a single tire, whenever said first output is being produced and said second output is not being produced.

2. Apparatus for classifying axles of vehicles moving along a roadway according to tire width, comprising:
   a plurality of sensing devices;

means for supporting said devices in laterally spaced positions across one side of a traffic lane;

said devices being divided into groups of equal length measured laterally of the roadway, and said groups being arranged in equal blocks with each block containing at least three groups;

a number of output circuits equal to the number of groups in a block, each one of said output circuits being coupled to all the sensing devices in the corresponding group of each of said blocks and adapted to produce an output signal whenever any one of said sensing devices is encountered by a tire;

first output means responsive to an output signal produced by any one of said output circuits for indicating that a tire has passed;

second output means responsive to the occurrence of output signals in all of said output circuits for indicating that the tire is a dual tire; and third output means responsive to the occurrence of an output signal in said first output means concurrent with the non-occurrence of an output signal in said second output means for indicating that the tire is a single tire.

3. Apparatus as claimed in claim 2 wherein there are at least two sensing devices in each group, the length of each group is about 7 inches, and there are three groups in each block.

4. Apparatus as claimed in claim 2 wherein there are at least two sensing devices in each group, the length of each group is about 4½ inches, and there are four groups in each block.

5. Apparatus as claimed in claim 2 wherein the length of each group is about 3½ inches and there are five groups in each block.

6. Apparatus as claimed in claim 2 wherein said sensing devices and supporting means comprise:
a housing adapted to extend across one side of the traffic lane;
at least four continuous conductors extending substantially the full length of said housing, one of said conductors providing a common connection to all of said sensing devices and the others providing said output circuits;
insulating means supporting said output circuit conductors in insulated relationship to each other, and normally supporting said output circuit conductors in spaced relationship to said common connection conductor; and
said insulating means being so arranged at each sensor location as to permit the appropriate one of said output circuit conductors to conductively engage said common connection conductor in response to the passage of a vehicle tire thereover.

7. Apparatus as claimed in claim 6 wherein said common connection conductor is a wide flat metal strip, and said output circuit conductors are relatively narrow flat metal strips disposed essentially in side-by-side relationship and occupying a plane parallel to said wide metal strip.

8. Apparatus for classifying axles of vehicles moving along a roadway according to tire width, comprising:
a plurality of sensing devices;
means for supporting said devices in laterally spaced positions across one side of a traffic lane, adjacent devices being sufficiently close together so that the narrowest tire to be detected will encounter at least one of said devices;

said devices being divided into groups of equal length measured laterally of the roadway, the group length being no greater than the difference in width between the narrowest dual tire to be detected as such and the widest single tire to be detected as such, said groups being arranged in equal blocks with each block containing at least three groups, and the length of one block minus one group being less than the width of the narrowest dual tire to be detected as such;

a number of output circuits equal to the number of groups in a block, each one of said output circuits being coupled to all the sensing devices in the corresponding group of each of said blocks and adapted to produce an output signal whenever any one of said sensing devices is encountered by a tire;

an OR circuit responsive to an output signal produced by any one of said output circuits for indicating that a tire has passed; and an AND circuit responsive to the occurrence of output signals in all of said output circuits for indicating that the tire is a dual tire.

9. Apparatus as claimed in claim 8 which includes an additional AND circuit for indicating that a single tire has passed, having one input coupled to the output of said OR circuit and another input coupled through an inverter to the output of said first-named AND circuit.

10. Traffic counting and classifying apparatus comprising:
a row of equally spaced sensors extending across about half a traffic lane of a roadway and each adapted to selectively close an electrical circuit in response to the movement of a vehicle tire thereover;
said sensors being arranged into groups containing equal numbers of sensors, said groups being arranged into blocks of equal length;
a common electrical return conductor extending down said row and connected to one side of each of said sensors;
a plurality of signal lines extending down said row, each of said signal lines being connected to the other side of each sensor of one group of each block of sensors;
each signal line being connected to different sensor groups than every other signal line, and the sensor groups to which each signal line is connected forming an equally spaced series;
housing means adapted to support said sensors, return conductor, and signal lines in their proper relative positions;
and which further includes an OR circuit responsive to an output signal produced by any one of said signal lines for indicating that a tire has passed.

11. Apparatus as claimed in claim 10 wherein each of said sensors is an electrical switch, and said return conductor is a flat metallic conductor which extends the full length of said row of sensors and forms a part of each of said switches.

12. Apparatus as claimed in claim 11 wherein each of said signal lines is a flat metallic conductor which extends the full length of said row of sensors and forms a part of the respectively associated group of switches.

13. Apparatus as claimed in claim 11 which further includes a continuous sheet of insulating material disposed between said return conductor and said signal lines and having an opening therein at each sensor location, the opening being so situated as to permit selective engagement with said return conductor by the particular signal line belonging to that sensor location.

14. Apparatus as claimed in claim 10 which further includes an AND circuit responsive to the occurrence of output signals on all of said signal lines for indicating that the tire is a dual tire.

15. Apparatus as claimed in claim 14 which includes an additional AND circuit having one input coupled to the output of said OR circuit, and another input coupled through an inverter to the output of said first-named AND circuit, for indicating that a single tire has passed.

* * * * *